(12) United States Patent
Gulley et al.

(10) Patent No.: US 10,203,934 B2
(45) Date of Patent: *Feb. 12, 2019

(54) PARALLELL PROCESSING OF A SINGLE DATA BUFFER

(71) Applicant: Intel Corporation, Santa Clara, CA (US)

(72) Inventors: Sean M. Gulley, Boston, MA (US); Wajdi K. Feghali, Boston, MA (US); Vinodh Gopal, Westborough, MA (US); James D. Guilford, Northborough, MA (US); Gilbert Wolrich, Framingham, MA (US); Kirk S. Yap, Framingham, MA (US)

(73) Assignee: Intel Corporation, Santa Clara, CA (US)

(*) Notice: Subject to any disclaimer, the term of this patent is extended or adjusted under 35 U.S.C. 154(b) by 154 days.

This patent is subject to a terminal disclaimer.

(21) Appl. No.: 13/631,763

(22) Filed: Sep. 28, 2012

(65) Prior Publication Data

US 2014/0019694 A1 Jan. 16, 2014

Related U.S. Application Data

(60) Provisional application No. 61/670,472, filed on Jul. 11, 2012.

(51) Int. Cl.
*G06F 5/06* (2006.01)
*G06F 21/64* (2013.01)
(Continued)

(52) U.S. Cl.
CPC ............... *G06F 5/06* (2013.01); *G06F 21/64* (2013.01); *H04L 9/0643* (2013.01);
(Continued)

(58) Field of Classification Search
CPC ......... G06F 5/06; G06F 21/64; H04L 9/0643; H04L 9/3236
See application file for complete search history.

(56) References Cited

U.S. PATENT DOCUMENTS 6,018,778 A 1/2000 Stolowitz et al.
7,047,530 B2 5/2006 Lu
(Continued)

FOREIGN PATENT DOCUMENTS

CN 101288058 A 10/2008
CN 101304473 A 11/2008
(Continued)

OTHER PUBLICATIONS

Martijn Sprengers, "GPU-based Password Cracking on the Secruity of Password Hashing Schemes Regarding Advances in Graphics Processing Units", Feb. 2011, Radboud University Nijmegen, Thesis No. 646, all pages.*
(Continued)

*Primary Examiner* — Eric Cardwell
(74) *Attorney, Agent, or Firm* — Barnes & Thornburg LLP (57) ABSTRACT

Technologies for executing a serial data processing algorithm on a single variable-length data buffer includes padding data segments of the buffer, streaming the data segments into a data register and executing the serial data processing algorithm on each of the segments in parallel.

18 Claims, 3 Drawing Sheets

(51) Int. Cl.
*H04L 9/06* (2006.01)
*H04L 9/32* (2006.01)

(52) U.S. Cl.
CPC ........ *H04L 9/3236* (2013.01); *H04L 2209/12* (2013.01); *H04L 2209/20* (2013.01)

(56) References Cited

U.S. PATENT DOCUMENTS

| | | | |
|---|---|---|---|
| 7,266,825 | B2 | 9/2007 | Lankreijer |
| 7,734,674 | B2 | 6/2010 | Cohen et al. |
| 8,055,970 | B1 * | 11/2011 | Smith .................. H04L 9/3236 714/752 |
| 2005/0210467 | A1 | 9/2005 | Zimmer et al. |
| 2007/0294510 | A1 | 12/2007 | Stuttard et al. |
| 2008/0165953 | A1 | 7/2008 | Sarvar |
| 2008/0229055 | A1 | 9/2008 | Craft |
| 2010/0106976 | A1 | 4/2010 | Aciicmez et al. |
| 2010/0312801 | A1 | 12/2010 | Ostrovsky et al. |
| 2011/0035426 | A1 | 2/2011 | Chen et al. |
| 2012/0117361 | A1 | 5/2012 | Archer et al. |
| 2013/0332742 | A1 * | 12/2013 | Gueron .................. G09C 1/00 713/189 |
| 2014/0019693 | A1 | 1/2014 | Gulley et al. |

FOREIGN PATENT DOCUMENTS

| | | |
|---|---|---|
| CN | 102118387 A | 7/2011 |
| CN | 102315937 A | 1/2012 |
| JP | 2011081594 | 4/2011 |
| WO | WO 01/56221 A2 | 8/2001 |
| WO | 2011/056278 | 5/2011 |
| WO | 2014011743 A1 | 1/2014 |
| WO | 2014011746 A1 | 1/2014 |

OTHER PUBLICATIONS

Jim Guilford, Kirk Yap, Vinodh Gopal, "Fast SHA-256 Implementations on Intel Architecture Processors", May 2012, INTEL, pp. 1-18.*
Zalewski, Przemysław, Marcin Łukowiak, and Stanisław Radziszowski. "Case study on FPGA performance of parallel hash functions." Przegląd Elektrotechniczny 86 (2010): 151-155.*
Sklavos, Nicolas, Gregory Dimitroulakos, and O. Koufopavlou. "An ultra high speed architecture for VLSI implementation of hash functions." Electronics, Circuits and Systems, 2003. ICECS 2003. Proceedings of the 2003 10th IEEE International Conference on. vol. 3. IEEE, 2003.*
International search Report and Written Opinion received for International Application No. PCT/US2013/049887, dated Sep. 27, 2013, 12 pages.
National Institute of Standards and Technology,"Secure Hash Standard (SHS)," Federal Information Processing Standards Publication 180-4, Mar. 2012, 35 pages.
Gulley et al., "Multi-Hash: A Family of Cryptographic Hash Algorithm Extensions," White Paper, Intel Corporation, Jul. 2012, 16 pages.
Gopal et al., "Processing Multiple Buffers in Parallel to Increase Performance on Intel® Architecture Processors," White Paper, Intel Corporation, Jul. 2010, 24 pages.
U.S. Appl. No. 13/631,761, filed Sep. 28, 2012, 26 pages.
Ozturk et al., "New Instructions Supporting Large Integer Arithmetic on Intel® Architecture Processors," White Paper, Aug. 2012, 16 pages.
Ozturk et al., "RSAX Code," rsax_mod_exp_1024_Complete_VS zip package, retrieved from <http://www.intel.com/p/en_US/embedded/hwsw/software/crclicense?id=6336&iid=6337> on Nov. 25, 2012, 112 pages.

Jonsson et al., "Public-Key Cryptography Standards (PKCS) #1: RSA Cryptography Specifications Version 2.1," RFC 3447, Feb. 2003, 72 pages.
RSA Security Inc., "PKCS #1 v2.1: RSA Cryptography Standard," Public-Key Cryptography Standards (PKCS), Jun. 14, 2002, 61 pages.
RSA Security Inc., "PKCS #15 v1.1: Cryptographic Token Information Snytax Standard," Public-Key Cryptography Standards (PKCS), Jun. 6, 2000, 81 pages.
U.S. Appl. No. 13/712,401, filed Dec. 12, 2012, 51 pages.
U.S. Appl. No. 13/707,105, filed Dec. 6, 2012, 57 pages.
International Search Report and Written Opinion received for International Application No. PCT/US2013/049890, dated Aug. 29, 2013, 11 pages.
Japanese Office Action and English Translation for Application No. 2015-515295, dated Jan. 26, 2016, 7 pages.
Tsubouchi, Yuuki, et al. "A SSE-based approach for improving the throughput of SHA-1 computation for Deduplication Storage," vol. 2012-HPC-133, No. 31, 2012 Information Processing society of Japan.
Ohta, Hidenori, et al., "An Improved SHA-1 Implementation Using Data Slicing," The 2010 Symposium on Cryptography and Information Security Takamatsu, Japan, Jan. 19-22, 2010.
Sprengers, Martijn, "GPU-based Password Cracking on the Security of Password Hashing Schemes regarding Advances in Graphics Processing Units," Feb. 2011.
Zalewski, Przemyslaw, et al., "Case Study on FPGA Performance of Parallel Hash Functions," Rochester Institute of Technology, Rochester, NY, USA, ISSN 0033-2097, R. 86 NR 11a/2010.
Notice of Preliminary Rejection for Korean Patent Application No. 10-2014-7034841, dated Nov. 25, 2015.
European Search Report for Application No. 13816809.1-1870/2872990, dated Jan. 28, 2016, 8 pages.
Notice of Preliminary Rejection for Korean Application No. 10-2016-7023749, dated Sep. 12, 2016, 7 pages.
Notice of Reasons for Rejection and English Translation for Japanese Application No. 2015-515295, dated Sep. 27, 2016, 6 pages.
First Office Action for Chinese Patent Application No. 201380030628.X, dated Jun. 1, 2016, 12 pages.
Notice of Final Rejection for Korean Patent Application No. 10-2014-7034841, dated May 31, 2016, 4 pages.
Search Report for European Application No. 13816262.3-1870/2872987, dated Jan. 25, 2016, 7 pages.
Office Action and English Translation for Japanese Patent Application No. 2015-514247, dated Dec. 15, 2015, 15 pages.
Sprengers, Martin, "GPU-based Password Cracking, on the Security of Password Hashing Schemes Regarding Advances in Graphics Processing Units," Radbound University Nijmegen, 122 pages.
Notice of Preliminary Rejection for Korean Patent Application No. 10-2014-7034829, dated Oct. 20, 215, 6 pages.
European Office Action for Application No. 13816809.1-1870, dated Aug. 8, 2017, 8 pages.
Chinese Office Action and English Translation for Patent Application No. 201380030628.X, dated Jul. 4, 2017, 22 pages.
Decision on Rejection and English Translation for Chinese Patent Application No. 201380030617.1, dated Sep. 5, 2017, 20 pages.
European Office Action for Patent Application No. 13816262.3-1870, dated Aug. 2, 2017, 6 pages.
Office Action for Chinese Application No. 201380030628.X dated Jan. 25, 2017, with English language translation, 20 pages.
Fourth Chinese Office Action with English translation, dated Jan. 19, 2018 for Chinese Patent Application No. 201380030628, 24 pages.
Decision on Rejection dated Apr. 23, 2018 for Chinese Patent Application No. 201380030628 with translation, 23 pages.

* cited by examiner

PARALLELL PROCESSING OF A SINGLE DATA BUFFER

CROSS-REFERENCE TO RELATED APPLICATION

This application claims the benefit of and priority to U.S. Provisional Patent Application Ser. No. 61/670,472, filed Jul. 11, 2012.

BACKGROUND

Software for verifying the security of data files and computer programs is prevalent in many different contexts, such as operating system boot sequences, loading of program code or data files, web browsing, data communication, and data storage. Serial data processing algorithms such as those used for authentication and/or encryption can operate in a chained dependent fashion on a single buffer of data. Those algorithms can be constrained by serial chaining in that the output resulting from the processing of one block of data in the buffer is often required for the processing of a subsequent block.

For example, cryptographic hash functions such as MD5 (Message-Digest Algorithm) and SHA1, SHA256 and SHA512 (Secure Hash Algorithms) can be expensive in terms of computation on general-purpose processors. Such hash functions work sequentially on single buffers of data, updating a hash digest state with the computations derived from each data block and using a number of rounds of processing that are dependent on each other. The sequential processing of the blocks of the single buffer limits the performance on modern processors. Methods such as multi-buffer processing using vector Single Instruction Multiple Data (SIMD) units have been proposed for better performance in applications where it is possible to work on multiple independent data buffers; however, those methods are not applicable to applications involving the hashing of a single buffer. Tree hashing is another technique that has been used, albeit across multiple cores or engines.

BRIEF DESCRIPTION

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
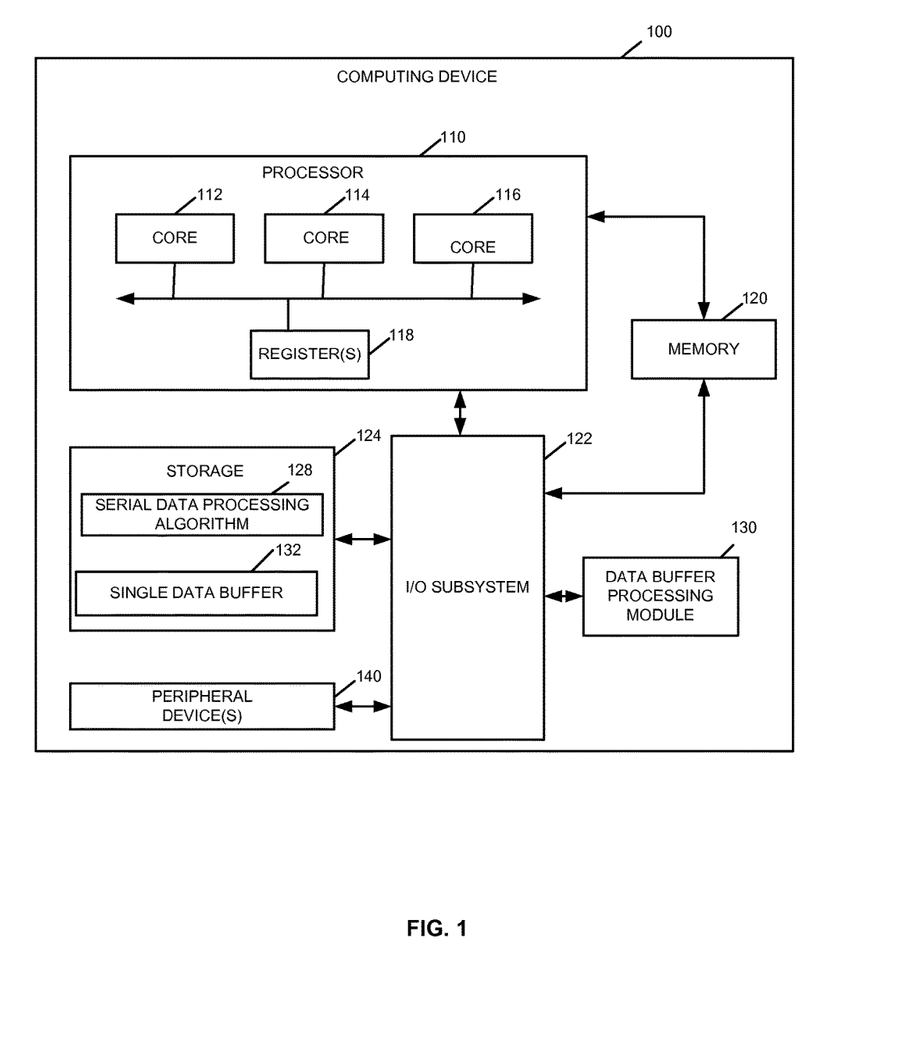
FIG. 1 is a simplified block diagram of at least one embodiment of a computing device in connection with which the disclosed methods may be implemented.

Referring now to FIG. 1, a data buffer processing module 130 is embodied in an illustrative computing device 100. In use, the data buffer processing module 130 takes as input a single data buffer 132 (e.g., a string or "message" of arbitrary length). The data buffer processing module 130 determines a level of parallelism for the single data buffer 132; that is, a number of "segments" of the single data buffer 132 that can be processed in parallel by a serial data processing algorithm 128 (e.g., a cryptographic hash function). The data buffer processing module 130 manages the parallel processing of the segments by the algorithm 128. Although different, the output of the algorithm 128 after such parallel processing has a security strength that is comparable to the results normally achieved by executing the algorithm 128 on a single data buffer in a traditional way (e.g., sequentially). Further, performance gains can be achieved as a result of the segmenting and parallel processing of the single data buffer 132. In this way, the data buffer processing module 130 can perform a serial data processing algorithm on a single data buffer of any arbitrary length, even though the underlying algorithm works on blocks of a specific size (e.g. 64 bytes).

The illustrative computing device 100 includes at least one processor 110, a memory 120, an input/output (I/O) subsystem 122, a storage device 124, and one or more peripheral devices 140. The computing device 100 may be embodied in or as any type of computing device, such as, for example, a desktop computer system, a laptop or tablet computer system, a server, an enterprise computer system, a network of computers, a handheld or otherwise mobile computing device, or other electronic device, depending on the particular application.

The illustrative processor 110 includes one or more processor cores or logical sections of a single core, e.g., processor cores 112, 114, 116, which are referred to herein simply as "cores" for ease of description. In some embodiments, one or more of the cores 112, 114, 116 is configured to process single-threaded computer programs (such as, in some embodiments, the data buffer processing module 130) using a SIMD (Single Instruction, Multiple Data) instruction set or similar set of computer instructions. More specifically, in some embodiments, at least one of the cores 112, 114, 116 is configured with an instruction set that includes one or more streaming extensions, such as the Streaming SIMD Extensions (SSE) or later versions (e.g., SSEn or AVX (Advanced Vector Extensions)).

The core or cores 112, 114, 116 include or are communicatively coupled to one or more data registers 118. The registers 118 may be utilized to temporarily store data and/or instructions during operation of the serial data processing algorithm 128, the data buffer processing module 130, and/or other components of the computing device 100. Each register 118 has a register size or "width," which is the amount of data the register 118 can store at a given time. At least one of the data registers 118 is configured for data-level parallelism. For example, in some embodiments, at least one data register 118 is configured for SIMD or similar data-level parallel processing; that is, it can be divided into multiple functional units (e.g., "lanes," "data paths," or "execution units") that can perform the same operation on multiple data at the same time or substantially the same time. For example, in a SIMD or similar register having a width of 128 bits, computer instructions can specify a number of lanes or data paths of the register 118 that can each process a portion of the 128 bits of data in parallel, so that the algorithm 128 can be executed on each of the data paths at the same time, independently of the other data paths.

The illustrative cores 112, 114, 116 also include or are communicatively coupled to one or more cache memory (not shown). The cache memory may be utilized to temporarily store data and/or instructions during operation of the serial data processing algorithm 128, the data buffer processing module 130, and/or other components of the computing device 100. In addition to the cache memory and the registers 118, the processor 110 and/or its cores 112, 114, 116 include, or are otherwise communicatively coupled to, the memory 120. Portions of the memory 120 may be embodied as any type of suitable memory device, such as a dynamic random access memory device (DRAM), synchronous dynamic random access memory device (SDRAM), double-data rate dynamic random access memory device (DDR SDRAM) and/or other volatile memory devices.

The processor 110 is also communicatively coupled to the I/O subsystem 122. Although not specifically shown, the I/O subsystem 122 typically includes a memory controller (e.g., a memory controller subsystem or northbridge), an input/output controller (e.g., an input/output controller subsystem or southbridge), and a firmware device. Of course, in other embodiments, I/O subsystems having other configurations may be used. For example, in some embodiments, the I/O subsystem 122 may form a portion of a system-on-a-chip (SoC) and be incorporated, along with the processor 110 and other components of the computing device 100, on a single integrated circuit chip. As such, it will be appreciated that each component of the I/O subsystem 122 may be located on a common integrated circuit chip in some embodiments.

The illustrative I/O subsystem 122 is communicatively coupled to one or more storage devices 124. Portions of the storage 124 may be embodied as any suitable device for storing data and/or instructions, such as disk storage (e.g. hard disks), memory cards, memory sticks, and/or others. In some embodiments, the serial data processing algorithm 128, the data buffer processing module 130, and/or the single data buffer 132 are at least temporarily embodied in the storage device 124. During execution, portions of the serial data processing algorithm 128, the data buffer processing module 130 and/or the single data buffer 132 may be loaded into the memory 120, cache memory, and/or the registers 118, for faster processing or other reasons. In other embodiments, the serial data processing algorithm 128 and/or the data buffer processing module 130 may be embodied as circuitry, machine-executable logic units, or the like. That is, the serial data processing algorithm 128 and/or the data buffer processing module 130 may each be embodied as software, firmware, hardware, and/or a combination thereof, in various embodiments. Further, the data buffer processing module 130 may be embodied as a sub-module or "extension" of the serial data processing algorithm 128, or as a function, procedure, or library object callable by the serial data processing algorithm 128 and/or other software (e.g., an operating system, a security application, and/or others). For example, the buffer processing module 130 may be embodied as one or more software extensions to an existing or future cryptographic hash algorithm, such as a Secure Hash Algorithm.

The I/O subsystem 122 may be communicatively coupled to one or more peripheral devices 140. The peripheral device(s) 140 may include one or more network interfaces, graphics and/or video adaptors, keyboard, touchscreens, displays, printers, data storage devices, and/or other peripheral devices, depending upon, for example, the intended use of the computing device 100. Further, it should be appreciated that the computing device 100 may include other components, sub-components, and devices not illustrated in FIG. 1 for clarity of the description.

In general, the components of the computing device 100 are communicatively coupled as shown in FIG. 1, by one or more signal paths, which are represented schematically as double-headed arrows. Such signal paths may be embodied as any type of wired or wireless signal paths capable of facilitating communication between the respective devices. For example, the signal paths may be embodied as any number of wires, printed circuit board traces, via, bus, point-to-point interconnects, intervening devices, and/or the like.

Figure 2:
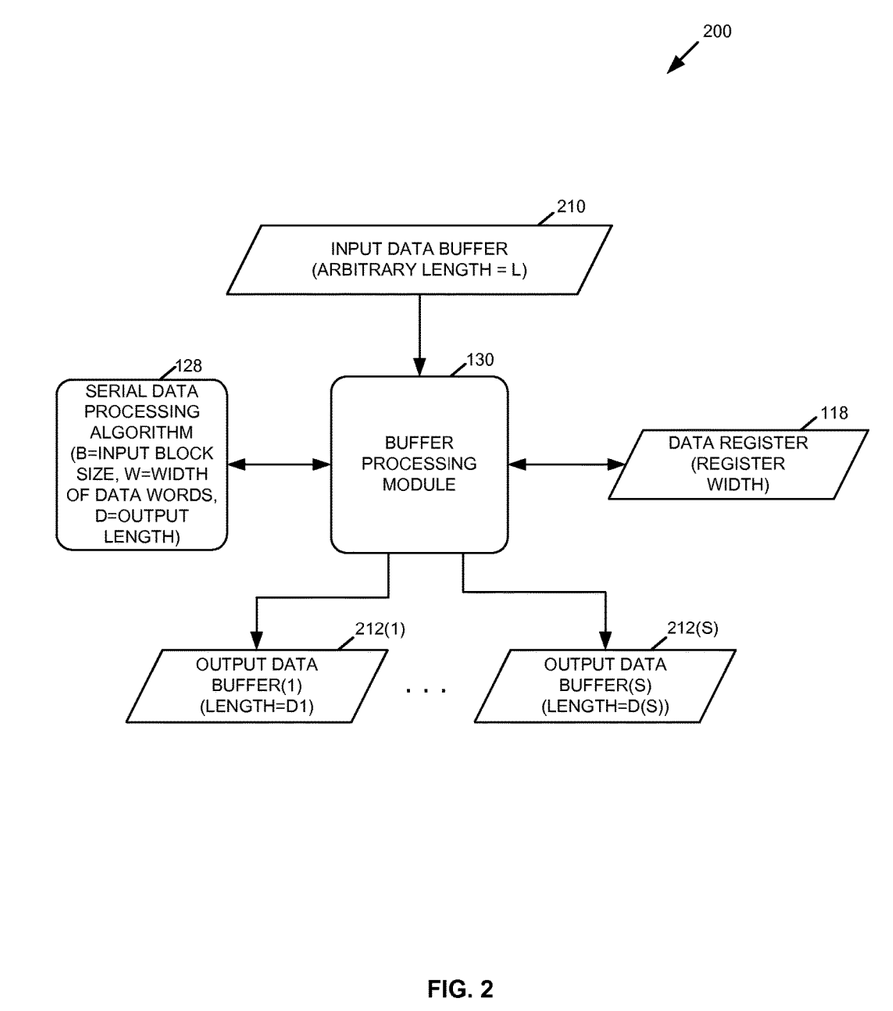
FIG. 2 is a simplified module diagram of at least one embodiment of a system for parallel processing of a single data buffer.

Referring now to FIG. 2, an illustrative system 200 in which the buffer processing module 130 manages parallel execution of the serial data processing algorithm 128 across an input data buffer 210, is shown. The illustrative input data buffer 210 is a string of data characters (e.g., a data file or "message") having an arbitrary size or length L (as measured in, e.g., bits or bytes). As described in more detail below, the buffer processing module 130 divides the contents of the input data buffer 210 into a number of segments S, where the number of segments is a positive integer representing the level or degree of parallelism across the input data buffer 210 that is desired or which is possible given the requirements of a particular design or implementation of the system 200. In the illustrative embodiments, each segment may be padded to a specified length in accordance with requirements of the serial data processing algorithm 128. In other words, some segments may be padded while others are not padded, depending on the segment's length before padding and the serial data processing algorithm 128's specifications.

The buffer processing module 130 streams the contents of the input data buffer 210 (e.g., the segments, padded as needed) into the data register 118 so that each segment is assigned to a different lane or data path of the register 118. The buffer processing module 130 initiates execution of the algorithm 128 on each lane or data path of the register 118, in parallel, so that each segment is processed by the serial data processing algorithm 128 concurrently.

The algorithm 128 processes, in parallel, each of the segments (padded, as needed) of the data buffer 210, serially in data blocks of a specified size B (as measured in, e.g., bits or bytes), where each data block is made up of a number of data words of size W (as measured in, e.g., bits or bytes), such that B is a multiple of W. The algorithm 128 generates an output (or "message digest," or "hash digest" in some embodiments) for each segment, which may be at least temporarily stored in an output data buffer 212. The contents of each of the output data buffers 212(1) . . . (S) (where S is the number of segments) has a fixed length D (as measured in, e.g., bits or bytes). Both the input data buffer 210 and the output data buffers 212(1) . . . 212(S) may be embodied as the single data buffer 132, or in one or more temporary storage buffers, in the various embodiments. For instance, the contents of the single data buffer 132 may initially correspond to the contents of the input data buffer 210, and may be updated as the execution of the buffer processing module 130 and/or the serial data processing algorithm 128 proceeds.

In some embodiments, the algorithm 128 is a cryptographic hash function such as MD5, SHA1, SHA256, or SHA512, and the data buffer processing module 130 uses as parameters certain specifications of the cryptographic hash function (as defined, e.g., in the relevant Federal Information Processing Standards Publication or FIPS PUB) in determining the number of segments S. As an example, the standards for the SHA256 secure hash function specify that B=512 bits, W=32 bits, and D=256 bits. The standard SHA256 hash function breaks the contents of an arbitrary-length input buffer into blocks of size B, and executes a number of computational rounds on each block using, in each round, a word of size W from the block. Each round updates the buffer, such that the output of one round is an input to the subsequent round.

Traditionally, the SHA256 hash function processes the blocks of the contents of the input buffer sequentially, such that the hash digest produced for one block is used as the initial hash digest for the processing of the next block, and so on, until each block of data in the input buffer has been processed. In contrast, the buffer processing module 130 defines multiple segments across a single data buffer, where each segment includes one or more blocks of data, and applies the algorithm 128 to each of the segments of the data buffer in parallel. For example, if a data register has a width of 256 bits, then the buffer processing module 130 can divide the contents of the input data buffer 210 into (register width)/W or 256/32=8 segments and execute the algorithm 128 on each of the 8 segments in parallel.

Figure 3:
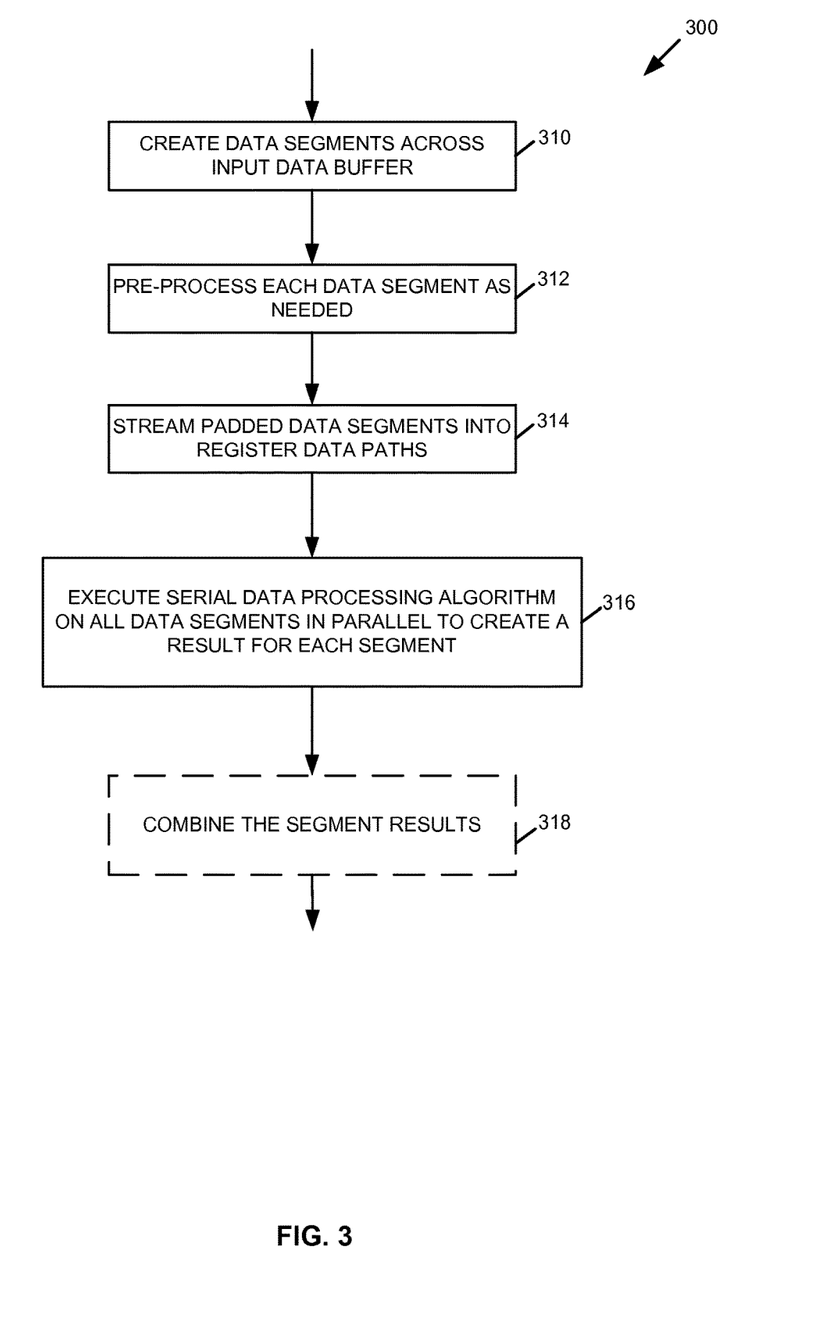
FIG. 3 is a simplified flow diagram of at least one embodiment of a method for parallel processing of a single data buffer.

Referring now to FIG. 3, an illustrative method 300 executable as computerized programs, routines, logic and/or instructions by the buffer processing module 130 and/or other modules or components of the computing device 100, for parallel processing of a single data buffer, is shown. At block 310, the method 300 determines the number of segments S in which to divide the contents of the input data buffer 210, and creates the determined number of segments by dividing the contents of the input buffer 210, accordingly. In some embodiments, the number of segments may be pre-determined and simply accessed as a parameter, argument, or stored value (e.g., from a look-up table or database). In other embodiments, the number of segments may be determined at load time or runtime. In some embodiments, the number of segments may be a function of the width of the register 118, the parameters or specifications of the serial data processing algorithm 128 (e.g., block size, word size, output length, etc.), and/or the length of the input data buffer 210. As an example, where an SHA256 hash function is used as the algorithm 128, S=8, W=4 bytes, and B=64 bytes.

Still at block 310, each of the segments is defined as being comprised of data words having a particular width (e.g., 32 bits). In some embodiments, the segment word width corresponds to the word width W specified by the algorithm 128. The segments are each created using every Sth word of the input data buffer 210, such that the length of the segment is evenly divisible by the block size B. The length L of the input data buffer 210 is divided by the segment block size (S multiplied by B, or SB) to determine how much of the contents of the input data buffer 210 can be processed in segments of the same size. Where the length L of the input data buffer is not evenly divisible by SB, one or more of the segments may be padded or a final segment comprising the remaining data may be created. In the SHA256 example, SB=8*64=512 bytes. Since there are 8 segments, each segment is formed using every $8^{th}$ data word (32 bits, or 4 bytes) in the input data buffer 210, up to 512*N bits, where N is a positive integer and 512*N is less than L.

At block 312, the method 300 performs any necessary padding of each of the segments, either as part of a pre-processing routine or "on the fly" as needed. For example, in the case of cryptographic hash functions, each segment may be padded as needed by appending (e.g., by concatenation) a number of data bits plus an indication of the buffer length to the end of the message so that the segment is of a specified length for processing by the selected algorithm 128. In some embodiments, the padding includes a "1" bit followed by the necessary number of "0" bits followed by the buffer length. In other embodiments, other combinations or patterns of "0" and "1" bits may be used in the padding of each segment. The standards or specifications that define the underlying algorithm 128 specify the padding scheme. In some embodiments, each of the segments is extended by a number of bits sufficient to make the padded buffer the smallest multiple of the block size. For example, each segment of the buffer 210 may be padded to its nearest multiple of B bytes, and then processed with S-way SIMD processing applied to the algorithm 128 to generate S digests. In this case, the per-segment padding is done according to the algorithm 128's standard padding scheme. In some cases (such as in the case of a remainder segment), a segment may have a different padded length than other padded segments. For instance, padding may result in a segment having an additional block when the amount of data in the segment plus the requisite padding exceeds the block size.

At block 314, the method 300 streams or otherwise reads the segments into the data paths of the register 118, so that each segment is read into a different data path (using, e.g., interleaving). In some embodiments, this is accomplished by using a single data pointer that is incremented up to SB; that is, until all of the evenly-sized segments have been processed. In the SHA256 example, eight 32-bit words are read into 8 data paths of the register at a time. As another example, executing SHA-1 on a SIMD-capable microprocessor with 128-bit registers would have the following parameter settings: B=64 Bytes, W=4 Bytes, S=4, D=20 Bytes.

At block 316, the serial data processing algorithm 128 is executed on each of the padded data segments in parallel. That is, for each padded segment, the algorithm 128 sequentially processes the blocks of that segment, at the same time as the other segments are being similarly processed by the algorithm 128. Thus, an intermediate result (e.g., a hash digest) is created for each padded segment. In the SHA256 example, the SHA256 algorithm is executed on each data path/32-bit word substantially simultaneously, and then the next 8 words are read into the register data paths and processed in parallel by the SHA256 algorithm, and so on, up to the block size B.

Due to the fact that each data segment is padded and processed according to the algorithm 128's specifications, in some embodiments it is not necessary for the individual segment results to be combined. Thus, the segment results may be stored in separate buffers or together in one buffer (e.g., if concatenated). Optionally, at block 318, the individual S digests may be combined to form a single result, e.g., the final output of the algorithm 128. For example, the set of S digests may be treated as another data buffer of length S*D, and then a final hash of size D may be generated in a single buffer fashion. The segment results can be combined in a number of different ways, including using an exclusive-or (XOR) or addition (ADD) function, or by concatenating the segment results and then executing the algorithm 128 again. Using the SHA256 example, each of the 8 hash digests may be combined into one 256 bit hash digest. It should be appreciated by those skilled in the art that the method 300 can be easily adapted to other processor configurations and serial data processing algorithms. For example, registers having other register widths can be used. As an example, using the AVX3, which has a width of 512 bits, the number of segments S could be 16 rather than 8, and each segment could be made up of every 16$^{th}$ (32-bit) word.

In some embodiments, the data segments are analogous to interleaved independent buffers, where a number of independent hash digests are generated for those segments in parallel as discussed above. In some embodiments, the number of interleaved segments is a power of 2. In creating the segments, some embodiments of the method 300 interleave the data at a finer granularity (e.g., data words), rather than breaking the buffer 210 down into block- or greater-sized processing portions.

Referring again to FIG. 3, an illustrative embodiment of the method 300 uses a hash algorithm H, which is defined to work on an integral number of blocks of size B bytes each. The below embodiment hashes a message $M_0$ of length L with a given level of parallelism S (where the || symbol denotes concatenation). After the segments are created, the padding function associated with H extends each segment of the message with a pre-determined pattern and a concatenation of the segment length to the smallest length that is a multiple of B bytes.

Referring to block 310 of FIG. 3, the message $M_0$ is divided into S segments each of length L/S. The message $M_0$ may be divided in an interleaved fashion such that every word size W-bits of $M_0$ is assigned to a different segment. Each segment may be represented as an array of W-bit words:

$$Seg_0 = M_0[0] || M_0[S] || M_0[2S] || \ldots$$
$$Seg_1 = M_0[1] || M_0[S+1] || M_0[2S+1] || \ldots$$
$$\ldots$$
$$Seg_{S-1} = M_0[S-1] || M_0[(2S-1)] || M_0[(3S-1)] || \ldots$$

where each $M_0[n]$ is a word size W index into the message. Referring to block 312 of FIG. 3, the padding function specified by the algorithm 128 is applied to each segment of the message, generating individual segments each having a padded length. The padded length of each segment is the smallest length to which the respective segment can be extended that is a multiple of B bytes. As mentioned above, some segments may have a different padded length than other segments.

Referring to block 316 of FIG. 3, S leaf-level digests $D_k$ are generated on the padded segments as $D_k=H(Seg_k)$ for k=0 ... (S−1). Referring to block 318 of FIG. 3 (optionally), a new message $M_1$ may be created by interleaving the resultant digests from block 316 by every word size W-bits. If $M_1=D_0[0]||D_1[0] \ldots ||D_{(S-1)}[0]||D_1[1] \ldots ||D_{(S-1)}[(D/W)-1]$, then each $D_k[n]$ may be a word size W index into a segment's digest. The hash algorithm H may then be applied to $M_1$ (e.g., $H(M_1)$).

In some embodiments, the contents of the data buffer 210 aligned in memory is read (e.g., "streamed") directly into SIMD registers without the need for transposing. In some embodiments, the method 300 allows the data being streamed (e.g., from a network connection) to be fed directly into the register 118 without the need to know the length of the buffer 210 at start time. Accordingly, single-thread applications do not have to be modified (other than at the hash algorithm level) to take advantage of the performance benefits of the disclosed parallel processing.

In some embodiments, the algorithm 128 can be selected or ordered based on computation and/or security considerations, and the current (possibly ordered) list of cryptographic hash algorithms in various protocols/standards can be augmented with parallelized versions as disclosed herein (e.g. SHA1×4, SHA1×8, SHA256×4, SHA256×8, etc.).

In some embodiments, e.g., applications involving verifying signatures of files that are securely loaded, the signing entity replaces the existing cryptographic hashing algorithm of the chosen security (e.g. SHA256) with a version of the method 300 that is most efficient to compute for verification. For instance, if the verifying entity has a 128-bit SIMD data-path execution unit in its processor core, and if an SHA256-strength digest is desired, the SHA256×4 algorithm may be desired (as the SHA256 algorithm is 32-bit based, a 128-bit SIMD execution unit can process 128/32=4 segments, in parallel). Thus, instead of using one of the currently used 32-bit algorithms (e.g., MD5, SHA1, SHA256), the verifying entity would use a corresponding MD5×8, SHA1×4, SHA256×4 parallelized algorithm. In some embodiments, additional parallelism may be desired with MD5 due to the algorithm's constrained data-dependency chain, even though only 4 segments are needed from a 128-bit SIMD perspective.

In embodiments where there may be many verifying devices of different computation strengths, the signing entity may need to determine the level of parallelism that works for the majority of its verifying devices. The disclosed embodiments do not require the server to estimate this very accurately, as a larger level of parallelism can be created during signing, and the verifying agents can perform a multi-pass approach during verification, if their SIMD or hardware capability cannot process as many segments as specified, all at once. For example, a signer can use an ×4 scheme while a verifying agent could perform two passes of an ×2 scheme.

In some embodiments, some loss of efficiency could result if too many passes are needed (due, e.g., to managing multiple state variables of the digests), however, data can still be brought in efficiently in a streaming manner just once. In this case, the application will need to cycle through the sets of state variables. For instance, in some cases, a client device may not have a SIMD unit at all, and needs to perform simple scalar operations to process a SHA256×4 hash. In this case, instead of working with 1 set of SHA256 state variables (32 Bytes), it will simultaneously work on 4 such copies of state variables (128 Bytes), cycling through them as it processes words from the data buffer. This increase in state size is very small. However, the working-set size increase associated with message schedules for a block (e.g., for SHA) may be undesirable in some cases. If the increase in working-set size is problematic, one could choose to store four blocks of data and strictly work on one interleaved block at a time. Many other variations are possible, and various embodiments can permit any device to process a parallel hash signature efficiently without undue burden. However, if a fixed hardware engine is designed to perform the entire hash function, including padding, on a given buffer/length input, then the padding can be designed to be the same as the hardware to achieve the same result. If the hardware engine works on a per block basis or has a mode that does not include padding, then it can be used to perform the disclosed multi-hash methods.

Although the disclosed embodiments are capable of large degrees of parallelism (e.g., ×32 or ×64), it may be desirable in some embodiments to configure the method 300 in accordance with the capabilities of existing devices or reasonably anticipated future devices (e.g., ×4 or ×8).

In some embodiments, an SHA256×4 version of the method 300 has been shown to provide an approximately 2.6× performance gain over the best SHA256 algorithm computation on a reasonably sized 1 KB data buffer. In some embodiments, an MD5×8 version of the method 300 has been shown to result in an approximately 4.4× performance gain over the standard MD5 algorithm. The multi-hash performance should scale in proportion to increasing data-path widths of future processors. Further, using the disclosed embodiments, the resulting digest should be at least as secure and collision-resistant as the digest obtained by a direct application of the underlying hash function. In addition to the most commonly used hash functions today, the disclosed embodiments can be adapted for the new SHA3 candidates.

EXAMPLES

Illustrative examples of the devices, systems, and methods disclosed herein are provided below. An embodiment of the devices, systems, and methods may include any one or more, and any combination of, the examples described below.

Example 1 includes a computing device for processing a data buffer. The computing device includes a data buffer processing module to access an arbitrary-length data buffer having a buffer length and a plurality of data segments, each data segment having a segment length greater than zero and less than the buffer length; pad each data segment in accordance with a serial data processing algorithm; directly read each of the padded data segments into a data register, the data register having a plurality of data paths, each padded data segment being read directly into a different data path; and perform a serial data processing algorithm on each of the data paths substantially in parallel to produce a result for each data path.

Example 2 includes the subject matter of Example 1, and wherein the data buffer has an arbitrary length.

Example 3 includes the subject matter of any of Examples 1 and 2, and wherein the data buffer processing module comprises a data buffer processing module to directly read each of the padded data segments into a different data path of the data register.

Example 4 includes the subject matter of any of Examples 1-3, and wherein the data buffer processing module comprises a data buffer processing module to pad each of the data segments in accordance with the serial data processing algorithm.

Example 5 includes the subject matter of any of Examples 1-4, and wherein the data buffer processing module is embodied as an extension to a cryptographic hash algorithm.

Example 6 includes the subject matter of any of Examples 1-5, and wherein the data buffer processing module comprises a data buffer processing module to execute on a single core of a microprocessor of the computing device.

Example 7 includes the subject matter of any of Examples 1-6, and wherein the data buffer processing module comprises a data buffer processing module to execute on a single thread of the single core.

Example 8 includes the subject matter of any of Examples 1-7, and wherein the data buffer processing module comprises a data buffer processing module to execute on a single instruction, multiple data-capable processor of the computing device.

Example 9 includes the subject matter of any of Examples 1-8, and wherein the data buffer processing module comprises a data buffer processing module to execute with a single thread software application.

Example 10 includes a method for processing an arbitrary-length data buffer. The method includes defining the data buffer as a plurality of data segments, each data segment having a segment length greater than zero and less than the length of the data buffer; padding each data segment in accordance with a serial data processing algorithm; streaming the padded data segments into a data register, the data register having a plurality of data path execution units, each padded data segment being streamed into a different data path execution unit using a single data pointer; and executing a serial data processing algorithm in each of the data path execution units substantially in parallel to produce a result for each data path execution unit.

Example 11 includes the subject matter of Example 10, and further includes defining the segment length based on the width of the data register and a word size specified by the serial data processing algorithm.

Example 12 includes the subject matter of any of Examples 10 and 11, and wherein defining the data buffer as a plurality of data segments comprises dividing the data buffer into the plurality of data segments in an interleaved fashion.

Example 13 includes the subject mater of any of Example 10-12, and wherein the data buffer comprises a plurality of data words, and dividing the data buffer into the plurality of data segments in an interleaved fashion comprises assigning each data word in the data buffer to a different data segment, so that each data segment comprises an array of data words.

Example 14 includes the subject mater of any of Example 10-13, and wherein each result comprises a plurality of data words, and further comprising interleaving the results by the data words.

Example 15 includes the subject mater of any of Example 10-14, and wherein executing a serial data processing algorithm comprises executing a cryptographic hash function.

Example 16 includes the subject mater of any of Example 10-15, and further includes generating a hash digest for each of the padded data segments.

Example 17 includes the subject mater of any of Example 10-16, and further includes combining the hash digests to form a new data buffer and executing the cryptographic hash function on the new data buffer.

Example 18 includes the subject mater of any of Example 10-17, and wherein the combining comprises concatenating the results and executing the serial data processing algorithm on the concatenated results.

Example 19 includes the subject mater of any of Example 10-18, and further includes determining a block size associated with the serial data processing algorithm and padding each of the data segments so that the length of each of the padded data segments is a multiple of the block size.

Example 20 includes the subject mater of any of Example 10-19, and further includes appending a fixed pattern of data bits to each of the data segments.

Example 21 includes the subject mater of any of Example 10-20, and further includes determining the number of data segments based on a characteristic of a microprocessor of the computing device.

Example 22 includes the subject mater of any of Example 10-21, and further includes determining the number of data segments based on a characteristic of the serial data processing algorithm.

Example 23 includes a computing device having a processor and a memory having stored therein a plurality of instructions that when executed by the processor cause the computing device to perform the method any of Examples 10-22.

Example 24 includes one or more machine readable storage media comprising a plurality of instructions stored thereon that in response to being executed result in a computing device performing the method of any of Examples 10-22.

Example 25 includes one or more machine readable storage media comprising a plurality of instructions stored thereon that in response to being executed result in a computing device dividing the data buffer into plurality of data segments, each data segment having a segment length greater than zero and less than the length of the data buffer; padding each data segment according to a serial data processing algorithm; reading each padded data segment directly into a different data path execution unit of a data register of the computing device; and executing a cryptographic hash algorithm on each of the data path execution units substantially in parallel to produce a result for each data path execution unit.

Example 26 includes the subject mater of Example 25, and further includes combining the results produced at the data path execution units.

Example 27 includes the subject mater of any of Example 25 or 26, and further includes executing the cryptographic hash algorithm on the combined results.

Example 28 includes the subject mater of any of Example 25-27, and wherein the cryptographic hash algorithm comprises a Secure Hash Algorithm or an MD5 Algorithm.

Example 29 includes the subject mater of any of Example 25-28, and further includes defining the segment length based on the width of the data register and a word size specified by the cryptographic hash algorithm.

Example 30 includes the subject mater of any of Example 25-29, and wherein defining the data buffer as a plurality of data segments comprises dividing the data buffer into the plurality of data segments in an interleaved fashion.

Example 31 includes the subject mater of any of Example 25-30, and wherein the data buffer comprises a plurality of data words, each data word comprising a plurality of data bits, and dividing the data buffer into the plurality of data segments in an interleaved fashion comprises assigning each data word in the data buffer to a different data segment, so that each data segment comprises an array of data words.

Example 32 includes the subject mater of any of Example 25-31, and wherein each result comprises a plurality of data words, and the method comprises interleaving the results by the data words.

Example 33 includes the subject mater of any of Example 25-32, and further includes determining the number of data segments based on one or more of a characteristic of a microprocessor of the computing device and a characteristic of the cryptographic hash algorithm.

The invention claimed is:

1. A computing device for processing a data buffer, the computing device comprising:
   one or more microprocessors configured with an Advanced Vector Extensions (AVX)-based instruction set providing AVX-based operations;
   a data buffer processing module to:
      access a data buffer having a buffer length;
      determine a level of parallelism configured for the data buffer indicative of a plurality of data segments of the data buffer to be processed in parallel according to the AVX-based operations;
      define the plurality of data segments for the data buffer based on the level of parallelism configured for the data buffer, wherein each data segment has a segment length greater than zero and less than the buffer length and comprises one or more words;
      pad one or more of the data segments in accordance with a serial data processing algorithm;
      read each of the data segments into one or more data registers configured for data-level parallel processing, each data register of the one or more data registers having a plurality of data paths, wherein to read each of the data segments into the one or more data registers comprises to serially read, into any of the one or more data registers, one word from each data segment into a different data path of the same data register;
      perform the serial data processing algorithm on each of the data segments substantially in parallel to generate a hash digest for each of the data segments; and
      perform an addition (ADD) function on the generated hash digests to form a combined hash digest representative of an output of the serial data processing algorithm;
   wherein the data buffer processing module is configured for execution on a single thread of a single core of a microprocessor of the one or more microprocessors.

2. The computing device of claim 1, wherein the data buffer has an arbitrary length.

3. The computing device of claim 1, wherein the data buffer processing module comprises a data buffer processing module to directly read each of the padded data segments into a different data path of the data register.

4. The computing device of claim 1, wherein the data buffer processing module is embodied as an extension to a cryptographic hash algorithm.

5. The computing device of claim 1, wherein the data buffer processing module comprises a data buffer processing module to execute on a single instruction, multiple data-capable processor of the computing device.

6. A method for processing a data buffer, the method comprising:
   determining a level of parallelism configured for the data buffer indicative of a plurality of data segments of the data buffer to be processed in parallel according to one or more Advanced Vector Extensions-based operations;
   defining the data buffer as the plurality of data segments determined based on the level of parallelism configured for the data buffer, wherein each data segment has a segment length greater than zero and less than the length of the data buffer and comprises one or more words;
   padding one or more of the data segments in accordance with a serial data processing algorithm;
   streaming each of the data segments into one or more data registers configured for data-level processing, each data register of the one or more data registers having a plurality of data paths, wherein streaming each of the data segments into the one or more data registers comprises serially streaming, into any of the one or more data registers, one word from each data segment into a different data path of the same data register;
   executing the serial data processing algorithm on each of the data segments substantially in parallel to generate a hash digest for each of the data segments; and
   performing an addition (ADD) function on the generated hash digests to form a combined hash digest representative of an output of the serial data processing algorithm,
   wherein the method is executed by a single thread of a compute device.

7. The method of claim 6, further comprising defining the segment length based on the width of the data register and a word size specified by the serial data processing algorithm.

8. The method of claim 6, wherein defining the data buffer as a plurality of data segments comprises dividing the data buffer into the plurality of data segments in an interleaved fashion.

9. The method of claim 6, wherein executing a serial data processing algorithm comprises executing a cryptographic hash function.

10. The method of claim 6, wherein combining the hash digests forms a new data buffer, and further comprising, executing the cryptographic hash function on the new data buffer.

11. The method of claim 6, further comprising determining a block size associated with the serial data processing algorithm and padding the data segments so that the length of each of the data segments is a multiple of the block size.

12. The method of claim 11, further comprising appending a fixed pattern of data bits to each of the data segments.

13. The method of claim 6, further comprising determining the number of data segments based on one or more of a characteristic of a microprocessor of the computing device and a characteristic of the serial data processing algorithm.

14. One or more machine-readable storage media comprising a plurality of instructions stored thereon that in response to being executed result in a computing device:
   determining a level of parallelism configured for the data buffer indicative of a plurality of data segments of the data buffer to be processed in parallel according to Advanced Vector Extensions (AVX)-based operations;
   dividing the data buffer into the plurality of data segments based on the level of parallelism configured for the data buffer, wherein each data segment has a segment length greater than zero and less than the length of the data buffer and comprises one or more words;
   padding one or more of the data segments according to a serial data processing algorithm;
   reading each of the data segments into one or more data registers of the computing device, each data register of the one or more data registers configured for data-level parallel processing and having a plurality of data paths, wherein reading each of the data segments into the one or more data registers comprises serially reading, into any of the one or more data registers, one word from each data segment into a different data path of the same data register;
   executing a cryptographic hash algorithm on each of the data segments substantially in parallel to generate a hash digest for each of the data segments; and
   performing an addition (ADD) function on the generated hash digests to form a combined hash digest representative of an output of the serial data processing algorithm,
   wherein the plurality of instructions are configured to be executed on a single thread of a processor of the computing device.

15. The one or more machine-readable storage media of claim 14, wherein the plurality of instructions further comprise executing the cryptographic hash algorithm on the combined generated hash digests.

16. The one or more machine-readable storage media of claim 14, wherein the cryptographic hash algorithm comprises a Secure Hash Algorithm or an MD5 Algorithm.

17. The one or more machine-readable storage media of claim 14, wherein the data buffer has an arbitrary length.

18. The one or more machine-readable storage media of claim 14, wherein reading each data segment comprises reading each of the data segments into a different data path of the data register.

* * * * *

UNITED STATES PATENT AND TRADEMARK OFFICE
CERTIFICATE OF CORRECTION

PATENT NO. : 10,203,934 B2
APPLICATION NO. : 13/631763
DATED : February 12, 2019
INVENTOR(S) : Gulley et al.

Page 1 of 1

It is certified that error appears in the above-identified patent and that said Letters Patent is hereby corrected as shown below:

On the Title Page

Item (54) and in the Specification, Column 1, Line 1, "PARALLELL" should read --PARALLEL--

Signed and Sealed this
Sixteenth Day of April, 2019

Andrei Iancu
*Director of the United States Patent and Trademark Office*